Patented Nov. 9, 1937

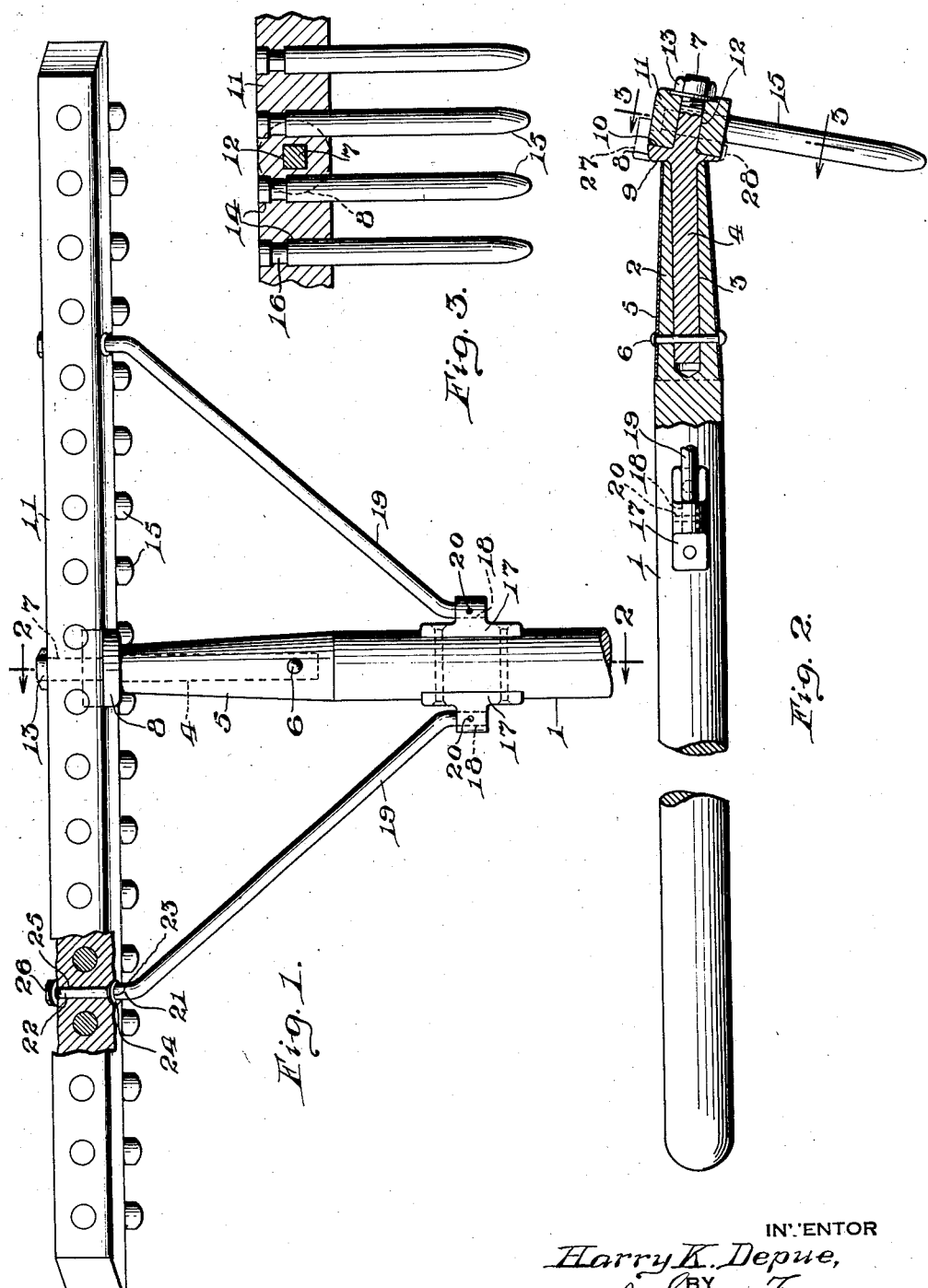

2,098,572

UNITED STATES PATENT OFFICE 2,098,572

RAKE

Harry K. Depue, Somerton, Pa.

Application October 29, 1935, Serial No. 47,211

3 Claims. (Cl. 306—35)

The object of the invention is to provide improvements in garden and similar rakes, and more especially in the manufacture and construction of the same.

Another object is to provide an improved connection between the usual handle and head of a rake, whereby the latter is maintained in the proper angular relationship with the former, said connection comprising a connecting member formed of oppositely and angularly directed arms, the axes of which intersect within the limits of a peripheral flange having a substantially wedge-shaped cross-section, and against the opposite faces of which directly abut the adjacent surfaces of the handle and head of the rake.

A further object is to provide an improved means of transverse bracing, whereby the head is prevented from shifting angularly with respect to the handle, said bracing against angular movement being in conjunction with means to prevent turning or twisting of the head upon or with respect to the handle, by forming the respective arms of the improved connecting member rectangular in cross-section.

Still another object is to provide the usual circular teeth of the rake with peripherally extending grooves, into which the material (usually wood) of the head of the rake enters, after the respective teeth are driven into place against the friction of a tight or drive fit.

With these and other objects in mind, the invention comprises further details of construction, which are hereinafter fully brought out in the following description, when read in conjunction with the accompanying drawing, in which Fig. 1 is a top plan view of a rake, except for the major portion of the handle which does not comprise a part of the invention, and also showing a portion of the head of the rake in fragmentary section;

Fig. 2 is a fragmentary vertical longitudinal section on the line 2—2 of Fig. 1; and Fig. 3 is a fragmentary section on the line 3—3 of Fig. 2.

Referring to the drawing, the invention comprises the combination of an elongated handle 1, having a tapered end portion 2, provided with an axial bore 3, which extends inwardly from the free end of said handle, and normally receives the longer arm 4 of a coupling member, said arm, handle and surrounding conical ferrule 5, being normally maintained in fixed unitary relation by means of a transversely extending pin or the like 6.

The coupling member itself comprises also a second and shorter exteriorly threaded arm 7, the axis of which extends angularly with respect to that of the shorter arm 4, and said axes intersecting at a point which is surrounded by an integral radially extending flange 8 or body portion of substantially triangular or wedge-shaped cross section, defined by substantially oppositely directed planular faces 9 and 10, which faces lie in intersecting planes perpendicular to the axes of the respectively adjacent arms of said member. The free end portion of the handle 1 abuts directly against the face 9 of said flange, while against the other face 10 of said flange there normally abuts the transversely extending rake head 11, a transverse bore 12 of which normally receives the shorter arm 7 of said coupling member, and is secured in rigid fixed relation therewith by means of a suitable nut and washer 13.

The head 11 is provided with substantially upwardly extending and laterally spaced bores 14, which are initially of the same diameter throughout their longitudinal extent. Into each of these bores is driven any well known type of pins forming teeth 15, each of which, however, is preferably provided in this instance with a circumferentially extending groove 16, into which groove the material of the head 11, usually of wood, normally contracts or swells, and thereby produces such positive inter-relation or joint between the rake head and its teeth, that they cannot be readily separated, this union being further enhanced by the use of a suitable waterproof glue or cement if desired in the usual manner.

The laterally opposite sides of the handle 1 are provided with any suitable type of brackets 17, which are preferably secured to each other in addition to being secured to the said handle, and are respectively provided as well with preferably parallel bores 18, into which normally extend the adjacent end portions of brace rods 19, said rods being secured in such position by transversely extending pins 20 or other suitable means. Said brace rods forwardly of the brackets 17 diverge angularly and at their outer ends bend again into parallelism at 21, beyond which they are radially reduced at 22, to provide a shoulder 23 against which are positioned washers 24. These washers bear against the rearward surface of the head 11, while the reduced portions 22 of said rods extend thru parallel bores 25 in said head, and beyond said head are provided with nut and washer combinations 26, or with other suitable means for rigidly securing said heads to said rods.

If desired, the arms 4 and 7 of said connecting member may be of rectangular cross section, as shown in Fig. 3, either or both of the bores 3 and 12 being produced by means of any well known type of mortising bit, in order to provide bores of the same or similarly cooperating cross section to that of the arms of said member. Having a rectangular cross section, said connecting member prevents the handle 1 from turning angularly about its axis with respect to said connecting member, or said member turning in a similar manner with respect to the head of the rake. Therefore, as the head is rigidly prevented from shifting angularly with respect to the handle, and is prevented from twisting angularly with respect to said handle in their common planes, by reason of the rigidity of the brace bars 19, there is produced a rake having the utmost degree of rigidity as a composite article of manufacture, and one which also provides for the best "rake" or angular relation between the plane of the teeth 15 with respect to the handle 1. To illustrate, instead of providing the arm 7 of the connecting member with a rectangular cross section, to prevent turning movement between said member and the head, said arm may be circular in cross section, and the flange 8, instead of being circular as shown, may be provided with upper and lower parallel flanges 27 and 28 between which the head 11 may be secured, and thereby similarly prevented from turning or angular movement.

I am aware that the invention may be embodied in other specific forms without departing from the spirit or essential attributes thereof, and I therefore desire the present embodiment to be considered in all respects as illustrative and not descriptive, reference being had to the appended claims rather than to the foregoing description to indicate the scope of the invention.

Having thus described my invention what I claim as new and desire to secure by Letters Patent is:—

1. A connecting member for the head and handle of a rake, comprising angularly related arms and an integral peripherally extending flange, surrounding the intersection of the axes of said arms, and said flange being defined by faces angularly related to each other, and against which a handle and a head are adapted to be secured.

2. In a rake, the combination of a head and a handle, with a connecting member, comprising an intermediate body portion having oppositely directed faces extending in intersecting planes, and integral arms extending freely from said body portion perpendicularly to the respective planes of said faces and angularly with respect to each other, and operative to be attached to said head and said handle with said head and handle in abutment against said faces.

3. In a rake, the combination of a head and a handle, with a connecting member, comprising an intermediate body portion having oppositely directed faces extending in intersecting planes, and in vertical longitudinal section being substantially triangular, and a pair of integral arms extending freely from said body portion and perpendicularly to the respective planes of said faces, and operative to be attached to said head and said handle with said head and handle abutting directly against said faces.

HARRY K. DEPUE.